US012296991B2

(12) United States Patent
Persechino et al.

(10) Patent No.: US 12,296,991 B2
(45) Date of Patent: May 13, 2025

(54) HYBRID INFLATABLE AIRCRAFT OF THE UNMANNED TYPE

(71) Applicant: C.I.R.A. (Centro Italiano Ricerche Aerospaziali) S.C.P.A., Capua (IT)

(72) Inventors: Giuseppe Persechino, Capua (IT); Vincenzo Rosario Baraniello, Capua (IT); Roberto Borsa, Capua (IT)

(73) Assignee: C.I.R.A. (CENTRO ITALIANO RICERCHE AEROSPAZIALI), Capua (IT)

( * ) Notice: Subject to any disclaimer, the term of this patent is extended or adjusted under 35 U.S.C. 154(b) by 0 days.

(21) Appl. No.: 18/263,757

(22) PCT Filed: Jan. 13, 2022

(86) PCT No.: PCT/IB2022/050246
§ 371 (c)(1),
(2) Date: Aug. 1, 2023

(87) PCT Pub. No.: WO2022/167875
PCT Pub. Date: Aug. 11, 2022

(65) Prior Publication Data
US 2024/0067368 A1 Feb. 29, 2024

(30) Foreign Application Priority Data

Feb. 5, 2021 (IT) .................. 102021000002609

(51) Int. Cl.
*B64U 10/25* (2023.01)
*B64C 39/06* (2006.01)
(Continued)

(52) U.S. Cl.
CPC ............ *B64U 10/25* (2023.01); *B64C 39/062* (2013.01); *B64U 10/30* (2023.01); *B64U 50/13* (2023.01);
(Continued)

(58) Field of Classification Search
CPC ........... B64B 1/58; B64C 39/062; B64C 3/10; B64U 10/30
See application file for complete search history.

(56) References Cited

U.S. PATENT DOCUMENTS

| 4,967,983 A | 11/1990 | Motts |
| 2014/0054421 A1* | 2/2014 | Bernard .................. B64B 1/58 244/128 |

(Continued)

FOREIGN PATENT DOCUMENTS

| DE | 102008038872 A1 * | 2/2010 | ............ B64B 1/005 |
| GB | 677734 A | 8/1952 | |

(Continued)

OTHER PUBLICATIONS

International Search Report for International Patent Application No. PCT/IB2022/050246, mailed Apr. 28, 2022.

*Primary Examiner* — Michael C Zarroli
*Assistant Examiner* — Peter A Taraschi
(74) *Attorney, Agent, or Firm* — Armstrong Teasdale LLP

(57) ABSTRACT

A hybrid aircraft of the unmanned type configured for joint and optimized use of aerostatic and aerodynamic force has an inflatable body having an outer shell and a load-bearing structure inside the outer shell, the inflatable body being adapted to assume a closed wing operating configuration.

12 Claims, 6 Drawing Sheets

(51) Int. Cl.
  *B64U 10/30* (2023.01)
  *B64U 30/10* (2023.01)
  *B64U 50/13* (2023.01)
  *B64U 50/31* (2023.01)
  *B64U 101/20* (2023.01)

(52) U.S. Cl.
  CPC .......... *B64B 2201/00* (2013.01); *B64U 30/10* (2023.01); *B64U 50/31* (2023.01); *B64U 2101/20* (2023.01)

(56) References Cited

U.S. PATENT DOCUMENTS

| | | | |
|---|---|---|---|
| 2014/0224938 A1* | 8/2014 | Barber | B64G 1/244 244/164 |
| 2016/0229518 A1* | 8/2016 | Kempshall | B64C 3/44 |
| 2017/0253325 A1 | 9/2017 | Zou | |

FOREIGN PATENT DOCUMENTS

| | | | | |
|---|---|---|---|---|
| RU | 2160689 C2 * | 12/2000 | | B64B 1/06 |
| WO | 2014022770 A1 | 2/2014 | | |

* cited by examiner

HYBRID INFLATABLE AIRCRAFT OF THE UNMANNED TYPE

CROSS-REFERENCE TO RELATED APPLICATIONS

This application is a National Stage Application of International Patent Application No. PCT/IB2022/050246, having an International Filing Date of Jan. 13, 2022, which claims priority to Italian Application No. 102021000002609, filed Feb. 5, 2021, the entire contents of which are hereby incorporated by reference herein.

FIELD OF THE INVENTION

The present invention relates to the technical field of aircraft of the unmanned type.

BACKGROUND OF THE INVENTION

Aircraft of the unmanned type are known. For example, and without introducing any limitation, there has been an increasing interest in recent years in unmanned aircraft, both tropospheric and stratospheric, and in particular in stratospheric platforms also named HAPS (High Altitude Pseudo-Satellite). This interest is motivated by the analysis of the possible applications which benefit from the advantages deriving from the use of an unmanned aircraft, such as monitoring for land security, precision agriculture, telecommunications and environmental monitoring.

Inflatable aircraft-type platforms, both tropospheric and stratospheric, offer four major advantages over composite or metal platforms, i.e., reduced structural weight, reduced aeroelastic issues due to the nature of the structure, possibility to use lighter-than-air gases as sustenance, and reduced volume in transport when deflated.

Unlike satellites, HAPS platforms offer the possibility to observe the Earth's surface on a local scale persistently, i.e. with practically no revisit time, and in proximity, i.e. from a height significantly lower than that of satellites thus providing a much higher image resolution than that provided by satellite remote sensing even installing less performing and cost-effective payloads.

A HAPS is a platform typically able to operate at an altitude of about 18-20 km above the Earth's surface (low stratosphere) and it can normally operate continuously for several months by virtue of the use of photovoltaic energy. The flight altitude (18-20 km) is very interesting because it is well above the range of altitudes concerned by commercial air traffic, so the impact of HAPS platforms on airways is limited only to the phases of ascent to mission altitude and descent to the landing base. Furthermore, from the point of view of meteorological conditions, the statistical analysis of the present wind conditions shows a minimum of strength precisely in this altitude range.

The stratosphere has a temperature profile that rises as altitude increases (unlike the troposphere). This makes this portion of the atmosphere stable, preventing the formation of updrafts and turbulence.

In recent years, several suggestions have been made regarding HAPS platforms. These suggestions can be grouped into three main platform types. The first type, also from a temporal point of view, is represented by stratospheric balloons. The second type is represented by fixed wing-type platforms and, finally, the third type is represented by airship-type platforms.

The stratospheric balloon-type and airship-type platforms are based on the exclusive use of aerostatic force to balance the weight (lighter-than-air), while the fixed wing-type uses only aerodynamic force (higher-than-air) to balance the weight.

Balloon-type platforms have a high ratio of payload weight to total weight. On the other hand, such balloon-type platforms typically do not have propulsion, nor other directional control systems, and thus do not offer the possibility of setting a predetermined trajectory, which is thus determined by wind conditions at various altitudes.

Fixed-wing platforms, on the other hand, are based on configurations with very large wing extensions to increase aerodynamic efficiency and are characterized by very light structures. For the latter reason, the overall weight of fixed-wing type platforms must be limited, reducing the available payload weight to a few kilograms (5-25 kg). Furthermore, the very light structures of these platforms can cause aeroelasticity problems at low altitudes, during the phases of ascent and descent.

The airship-type platforms, on the other hand, are designed for a very high payload (>200 kg) and have a very large size and a very high maximum takeoff weight (MTOW>3000-5000 kg) when compared to fixed-wing-type platforms. Such MTOW is mainly due to the presence of ballonets, which constitute a second inner shell of almost equal size to the outer shell, necessary to compensate for gas expansions as the altitude changes (the volume at altitude can be up to 20 times the volume at sea level). The large size of stratospheric airships makes ground operations difficult, especially in adverse weather conditions, and requires dedicated infrastructure for their deployment and shelter, making their tactical use essentially impossible.

Thus, two main aspects can be noted from the analysis of the stratospheric platforms of the prior art described above; the first aspect relates to the operation of such platforms, which is strongly biased by weather conditions leading to believe that they can only be deployed from a limited number of bases in the world. The second aspect concerns the weight available for the payload which is limited above 25 kg for platforms of the fixed-wing type, while an airship type platform is really convenient only for payload greater than 200 kg.

SUMMARY OF THE INVENTION

It is an object of the present invention to make available an aircraft of an alternative type relative to the platforms of the prior art discussed above which is characterized by an aero-structural configuration which allows efficiently absorbing torsional loads and allows reducing aerodynamic drag without necessarily requiring large wingspans.

According to an aspect of the invention, a further object, either as an alternative or in addition to the aforesaid object, is to make available an aircraft which allows reducing, relative to the platforms discussed above with reference to the prior art, the size and/or volume and/or cost and/or operating drawbacks of the aircraft.

According to an aspect of the invention, it is a further object, either as an alternative or in addition to the aforesaid objects, to make available an aircraft which allows solving or at least partially overcoming the drawbacks discussed above with reference to the platforms of the prior art.

According to an aspect of the invention, it is a further object, either as an alternative or in addition to the aforesaid objects, to make available an aircraft which allows reducing, with reference to the prior art, the weight, dimensions and costs of the aircraft for the same payload and thus can also be employed in tactical-type operations.

According to an aspect of the invention, it is a further object, either as an alternative or in addition to the aforesaid objects, to provide an aircraft which allows improved system reliability relative to the systems of the prior art described above.

According to an aspect of the invention, it is a further object, either as an alternative or in addition to the aforesaid objects, to provide an aircraft which can embark a payload in the 5-100 kg range, as required by many applications.

These and other objects are achieved by means of a hybrid inflatable aircraft of the unmanned type as described and claimed herein in its most general form and in several particular embodiments.

BRIEF DESCRIPTION OF THE FIGURES

The invention will be better understood from the following detailed description of its embodiments, made by way of example and consequently not limiting in any manner with reference to the accompanying drawings, in which.

DETAILED DESCRIPTION

Figure 1:
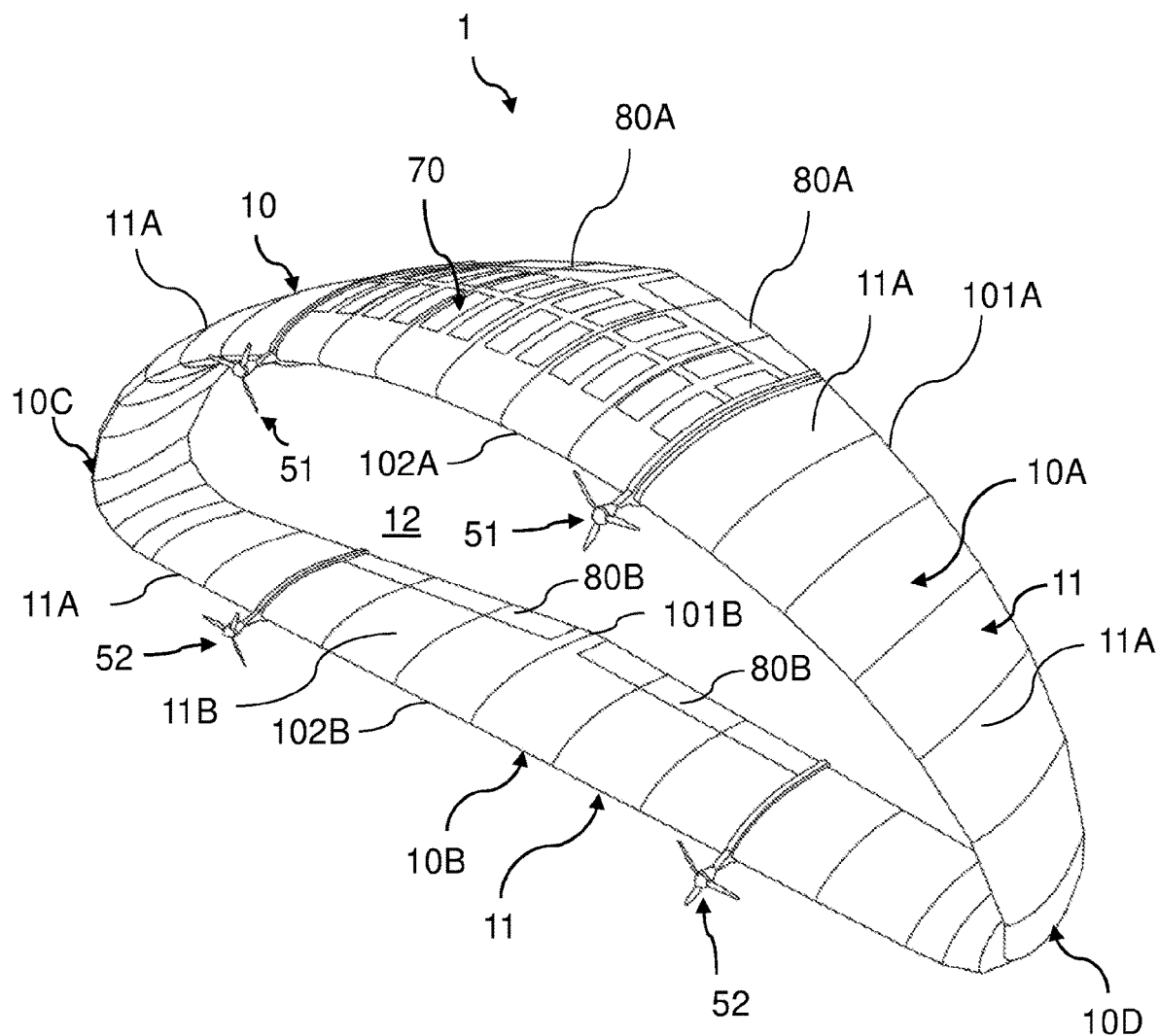
FIG. 1 shows a diagrammatic perspective view from the front side of a hybrid inflatable aircraft according to a currently preferred embodiment; the aircraft is shown free from the payload in the figure.

Similar or equivalent elements in the accompanying figures will be indicated by means of the same reference numerals.

Figure 3:
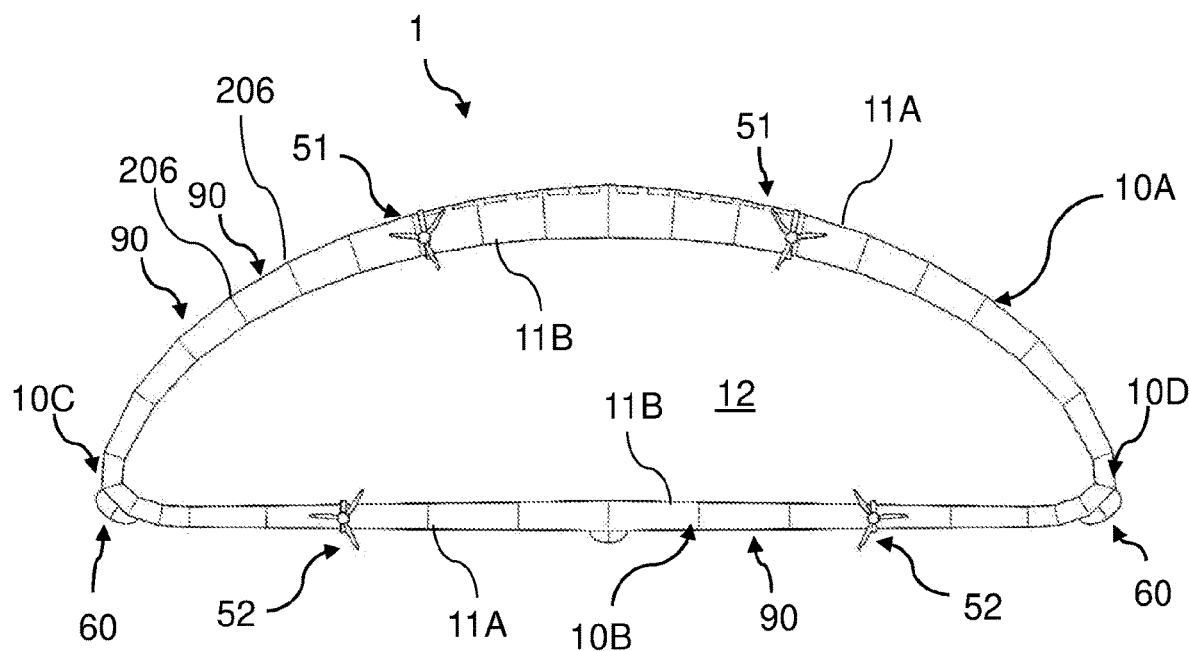
FIG. 3 shows a plan view from the front side of the aircraft in FIG. 1; the payload is also shown in this figure.
Figure 4:
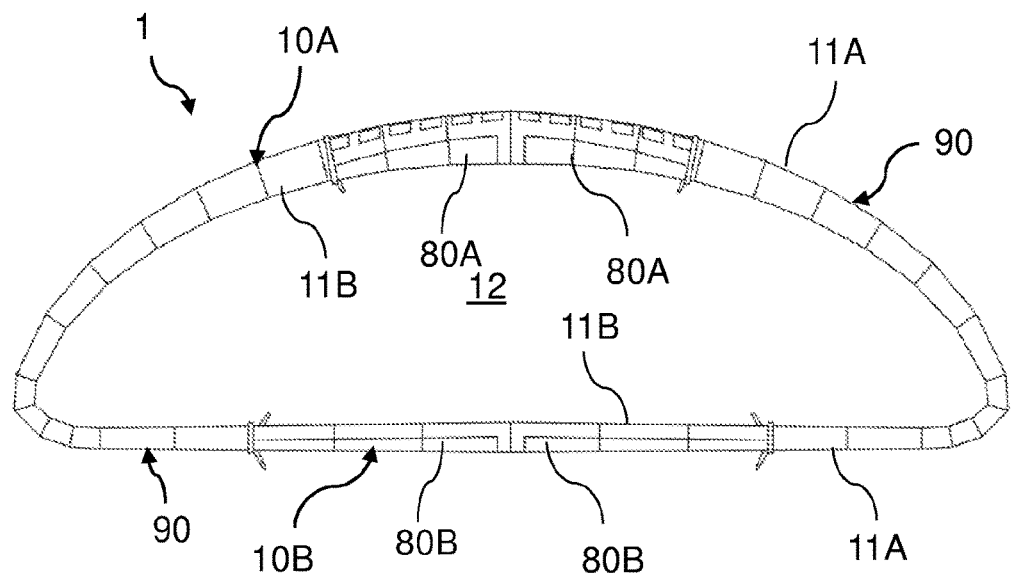
FIG. 4 shows a plan view from the rear side of the aircraft in FIG. 1; the aircraft is shown free of payload in this figure.

It is also worth noting that the terms "lower", "upper", "horizontal", "vertical", employed hereafter in the following description to describe parts of an aircraft according to the present invention, are intended to refer to a normal operating condition of such an aircraft at the assigned mission altitude. Again, the terms "front" and "rear" used hereafter in the following description to describe parts of an aircraft according to the present invention are intended to refer to the direction of advancement X1 (FIG. 6) of the aircraft in a normal operating condition of such an aircraft at the assigned mission altitude. Furthermore, the terms "radially outer" and "radially inner" employed to describe a part of an aircraft platform according to the present invention are intended to refer to an axis of the opening 12 to be described later (e.g. Cf. FIG. 3), wherein said axis is arranged centrally and orthogonally relative to the opening 12.

Figure 5:
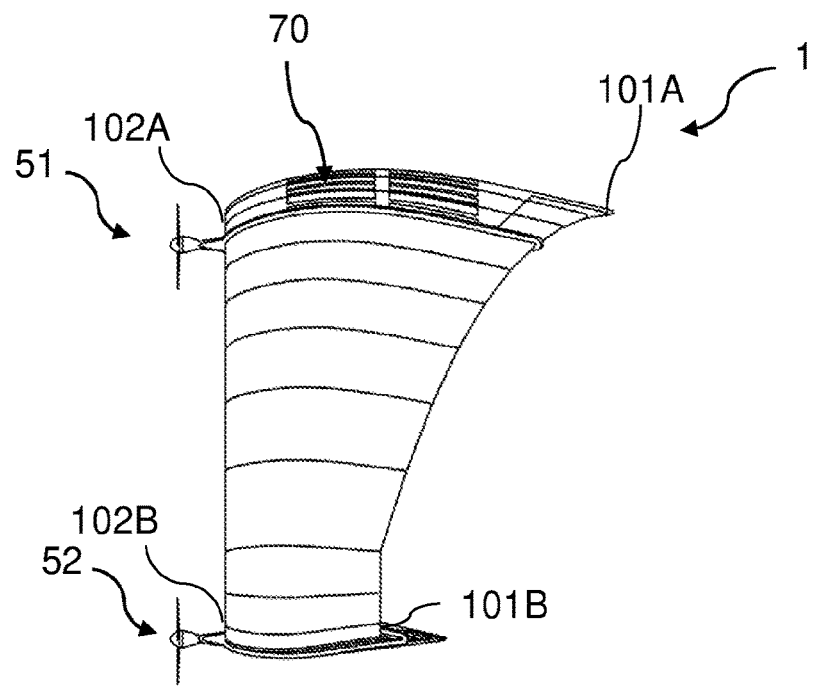
FIG. 5 shows a plan view from the side of the aircraft in FIG. 1; the aircraft is shown free of payload in this figure.
Figure 6:
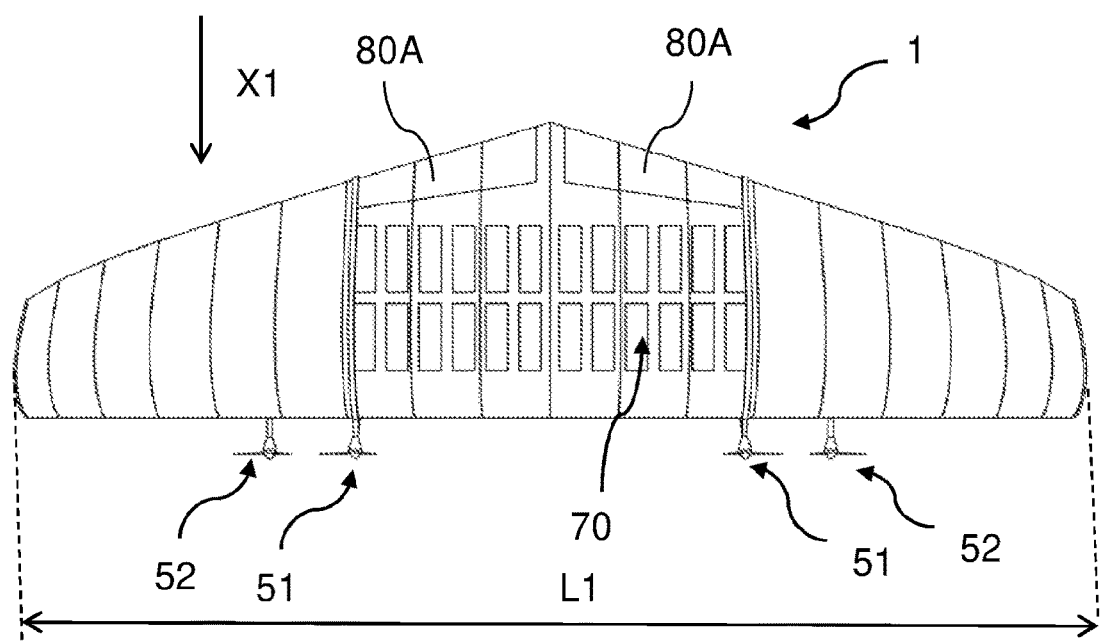
FIG. 6 shows a plan view from the top of the aircraft of FIG. 1; the aircraft is shown free of payload in this figure.
Figure 7:
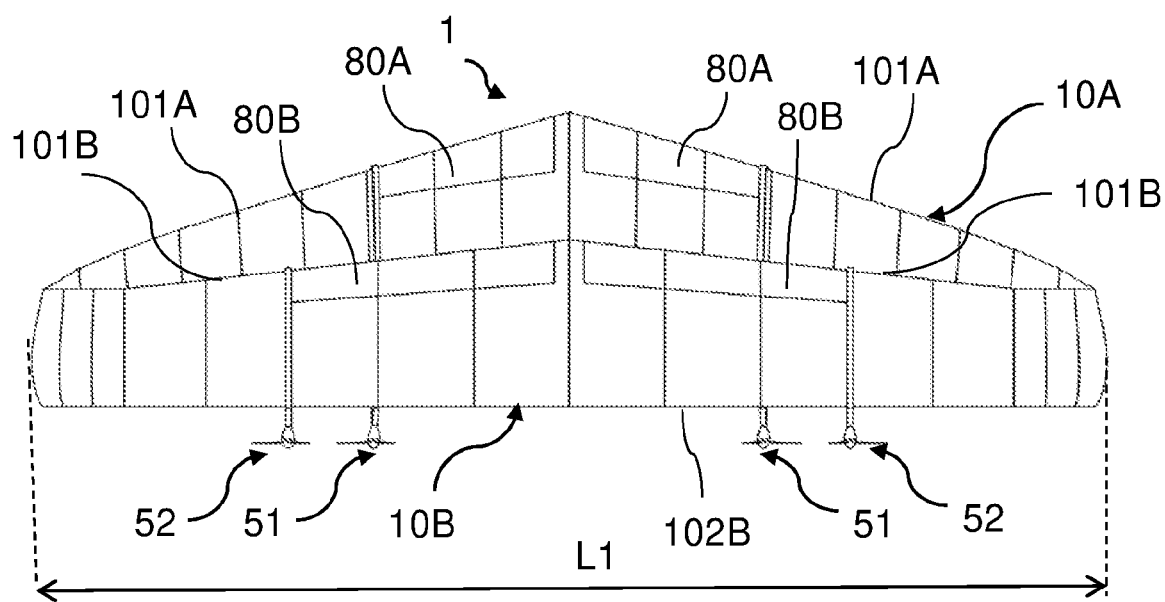
FIG. 7 shows a plan view from the bottom of the aircraft in FIG. 1; the aircraft is shown free of payload in this figure.

Referring initially to FIGS. 1-7, a hybrid aircraft of the unmanned type according to a currently preferred embodiment is indicated by reference numeral 1 as a whole. According to an embodiment, in particular, the aircraft 1 is a stratospheric platform and more preferably HAPS (High Altitude Pseudo-Satellite) stratospheric platform. Furthermore, it is also worth noting that for the purposes of this description, the term "hybrid" used to define an aircraft indicates the fact that the aircraft is configured for the optimized joint and balanced use of aerostatic and aerodynamic force. The term "optimized" means the choice of a buoyancy ratio (i.e., a percentage of aerostatic force to total force) to minimize the overall weight and footprint of the platform, having fixed the payload and minimum altitude to be reached with aerostatic force alone. In particular, a hybrid aircraft according to the present description is configured to jointly exploit both aerostatic buoyancy and lift. In other words, it is also worth noting that the aircraft 1 is conveniently configured to use the aerodynamic force not only to control the aircraft 1 but also to balance the weight of the aircraft itself during various flight phases. According to an embodiment, the aircraft 1 is a tactical type aircraft, meaning that it can be easily transported inside a standard container and deployed directly in the operating scenario. This is possible by virtue of its small size and MTOW (maximum take-off weight). With reference to FIGS. 5 and 6-7, according to an embodiment, in particular, the aircraft 1 has a maximum length L1, or wingspan L1, comprised in the range 8 m-25 m, an MTOW comprised in the range 30 kg-400 kg and a payload 60 in the range 5 kg-100 kg. In general, the aircraft 1 is adapted to be used for land monitoring. In particular, the aircraft 1 can be used in a plurality of different applications, such as but not limited to border monitoring, environmental monitoring, precision agriculture, telecommunications, homeland security and emergency support.

According to an embodiment, as will be understood in greater detail hereafter in the present description, the aircraft 1 has a combination of inflatable structural elements with different internal pressures, which are preferably coupled to stiff substructures (e.g. made of composite materials, aluminum, etc.) such as nacelles, engine mounts, movable control surfaces, etc. According to an embodiment, all inflatable elements of the aircraft 1 which will be described below in the present description, comprise laminated materials consisting of gas-retentive layers, structural layers and protective layers.

Again with reference to FIGS. 1-7, the aircraft 1 comprises an inflatable body 10. The inflatable body 10 include an outer shell 11, or outer skin 11, and a load-bearing structure 20 inside the outer shell 11. Conveniently, the inflatable body 10 is adapted to assume a closed-wing operating configuration (FIGS. 1,3-6,7 and 9C). In particular, in such a closed-wing operating configuration, the inflatable body 10 has an annular conformation, which extends about a through-opening 12. It is worth noting that according to an embodiment, the aforesaid closed-wing operating configuration corresponds to a design or mission configuration in which the platform 1 is inflated with a gas, preferably helium. According to an embodiment, in the closed-wing operating configuration, by virtue of its particular aero-structural configuration, the aircraft 1 can develop both lift very efficiently for about 60%-80% of the total weight of the aircraft 1 and aerostatic buoyancy for about 40%-20% of the total weight of the aircraft 1, the latter being filled with a gas lighter than air, which, as mentioned above, is preferably helium.

According to an embodiment, in the closed-wing operating configuration, the inflatable body 10 comprises a first arched portion 10A adapted to define an arched wing 10A having a leading edge 102A and a trailing edge 101A. Preferably, the arched wing 10A is a semi-elliptical or substantially semi-elliptical wing. Furthermore, in the closed-wing operating configuration, the inflatable body 10 comprises a second straight portion 10B adapted to define a straight wing 10B having a leading edge 102B and a trailing edge 101B. In particular, the arched wing 10A is an upper wing while the straight wing 10B is a lower wing. In the closed-wing operating configuration, the inflatable body 10 further comprises third and fourth connecting portions 10C, 10D arranged at opposite ends of the straight wing 10B. The connecting portions 10C,10D are adapted to connect the arched wing 10A and the straight wing 10B to each other. In other words, the connecting portions 10C,10D correspond to the opposite end portions, or tips, of each of the wings 10A,10B. In practice, by virtue of the connecting portions 10C,10D, the straight wing 10B closes both structurally and aerodynamically the arched wing 10A.

With reference to FIGS. 5 and 7, according to an embodiment, in a plan view from below of the aircraft 1 in the aforesaid operating configuration, the leading edges 102A, 102B are mutually aligned while the trailing edges 101A, 101B are mutually offset. However, according to an alternative embodiment, in a plan view from below of the aircraft 1 in the aforesaid operating configuration, the leading edges 102A,102B may be mutually offset to improve the stability and controllability characteristics of the aircraft. Indeed, by displacing the pressure centers of the arched wing 10A and the straight wing 10B could, for example, cancel the longitudinal moment with respect to the barycenter.

According to an embodiment, the control surfaces 80A, 80B are respectively associated with the arched wing 10A and the straight wing 10B. The control surfaces 80A,80B perform the control and trim functions of the aircraft 1. According to an embodiment, the control surfaces 80A,80B may also be stiff structures made of a composite material.

According to an embodiment, the aircraft 1 comprises solar panels 70, preferably flexible solar panels 70, which may be associated with the arched wing 10A and/or the straight wing 10B. According to an embodiment, the aircraft 1 comprises a pair of housings, or nacelles, for the payload 60, and preferably also for batteries and avionic systems, which are located at the third and fourth connecting portions 10C,10D.

According to an embodiment, the aircraft 1 comprises at least one propulsion system 51,52. The propulsion system 51,52 preferably includes a pair of front propellers 51, which are mutually spaced apart and associated with the arched wing 10A. Furthermore, the propulsion system 51,52 includes a pair of front propellers 52, which are mutually spaced apart and associated with the straight wing 10B. However, according to an embodiment, there may be more than four propellers 51,52. According to an embodiment, the propellers 51 are mutually aligned along a prevailing extension direction of the arched wing 10A, while the propellers 52 are aligned along a prevailing extension direction of the straight wing 10B. As can be seen, e.g. in FIGS. 6-7, according to an embodiment, the propellers 51 are relatively closer together, while the propellers 52 are relatively farther apart than the propellers 51. According to an embodiment, the propellers 51 and 52 comprise helical propellers. More in particular, according to an embodiment, the propellers 51 and 52 comprise driving helical propellers. Preferably, the propellers 51 and 52 comprise electric motors 51,52. In particular, according to an embodiment, the propulsion system 51,52 is fully electric and power generation is based on the aforementioned solar panels 70. More in particular, according to an embodiment, the aircraft 1 is designed to be completely energy self-sufficient and able to remain airborne for several weeks. Preferably, the energy storage required to ensure flight during night hours is based on high energy density batteries, such as Li—Po, Li—ION, Li—S, etc.

The particular closed-wing operating configuration of the aircraft 1 has significant structural and aerodynamic advantages. Structurally, the arched wing 10A has a small portion of loads distributed on it (supported in part by the aerostatic thrust due to the internal gas). For example, according to an embodiment, the loads distributed on the arched wing 10A are due to the weight of the wing 10A itself and preferably the presence of solar panels 70 and/or propellers 51 and/or control elements 40 (the latter, shown in FIG. 8, will be described in greater detail hereafter). However, most of the loads will be concentrated in the end portions, or tips, of the wing 10A, i.e. at the connecting portions 10C,10D where the payload 60 and preferably the batteries and avionics systems are arranged. According to an embodiment, by virtue of the arched structure and the particular load configuration in the connecting portions 10C,10D, the wing 10A will have to withstand mainly tensile loads which are optimally matched to the material from which the wing 10A itself is made, preferably mainly fabric. According to an embodiment, structurally the straight wing 10B will only have the following distributed loads; the weight of the wing 10B itself and preferably the propellers 52 and/or respective control elements 40 (the latter will be described hereafter). The straight wing 10B will contribute only a fraction of the loads concentrated in its end portions, or tips, i.e., the connecting portions 10C,10D. According to an embodiment, the straight wing 10B will have to support mainly bending loads which will be reduced by both the aerostatic buoyancy and the aerodynamic loads developed by the arched wing 10A at the respective end portions, i.e. at the connecting portions 10C,10D. Again from the structural point of view, the closed-wing operating configuration efficiently solves the need to absorb torsional loads, typical of a classic fixed wing with a free tip. Furthermore, such loads are optimally absorbed by the load-bearing structure 20 and the outer skin 11.

From an aerodynamic point of view, the closed-wing operating configuration represents an optimal solution to reduce induced drag without necessarily considering wide wingspans. The aerodynamic load is greater on the arched wing 10A than on the straight wing 10B. Furthermore, the arched wing 10A, due to its arched configuration, develops, in addition to lift, a lateral aerodynamic force which puts the straight wing 10B in traction and helps to support the bending loads of the latter.

Figure 2:
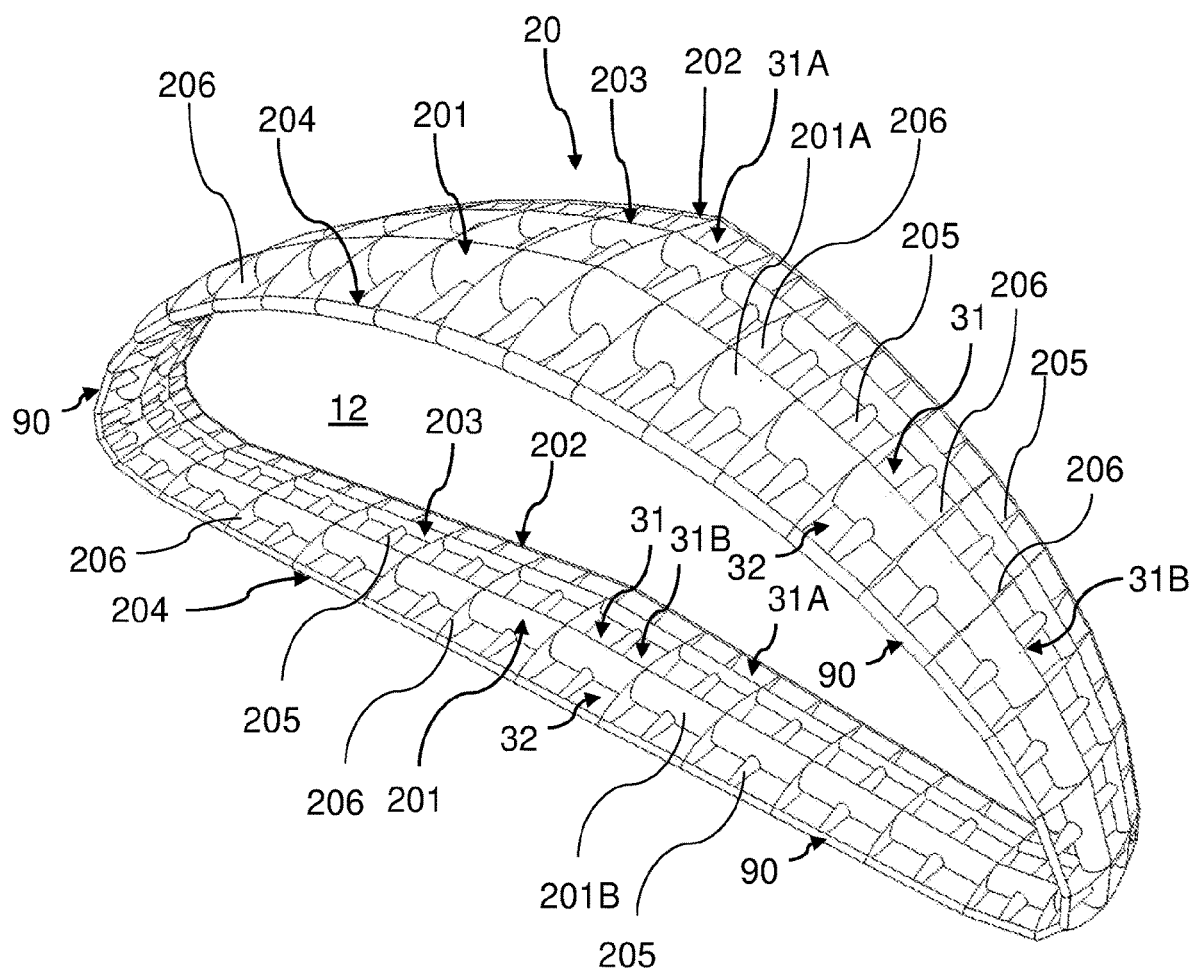
FIG. 2 shows a diagrammatic perspective view from the front side of an inner load-bearing structure of the aircraft in FIG. 1.

Referring to FIG. 2, according to an embodiment, the load-bearing structure 20 is an annular structure, which extends through the arched wing 10A, the straight wing 10B and the aforementioned third and fourth connecting portions 10C,10D.

According to an embodiment, the load-bearing structure 20 comprises at least one main annular spar 201. Advantageously, according to an embodiment, the at least one main spar 201 is an inflatable spar 201. In the embodiment in the example, the load-bearing structure 20 comprises a single main spar 201. According to an embodiment, in the closed-wing operating configuration, the at least one main spar 201 comprises an arched main spar portion 201A and a straight main spar portion 201B. The arched main spar portion 201A is associated with the arched wing 10A while the straight main spar portion 201B is associated with the straight wing 10B. In particular, the arched main spar portion 201A is a tubular portion, preferably having a circular cross-section, which is tapered from the center of said portion 201A toward the third and fourth connecting portions 10C,10D. Furthermore, the straight main spar portion 201B is a tubular portion, preferably having a circular cross-section, which is tapered from the center of said portion 201B toward the third and fourth connecting portions 10C,10D. Preferably, the section of the portion 201B is in particular variable as the percentage thickness of the wing profile 10B varies.

Again with reference to FIG. 2, according to an embodiment, the load-bearing structure 20 comprises at least one secondary annular spar 202-204 having a smaller sized cross-section than a cross-section of said main spar 201. According to an embodiment, at least one secondary spar 202-204 is advantageously an inflatable spar. According to an embodiment, the at least one secondary spar 202-204 comprises a trailing edge spar 202, a leading edge spar 204, and an intermediate spar 203. In particular, the trailing edge spar 202 is arranged at the trailing edges 101A,101B of the arched wing 10A and the straight wing 10B. The leading edge spar 204 is arranged at the leading edges 102A,102B of the arched wing 10A and the straight wing 10B. The intermediate spar 203 is interposed between the at least one main spar 201 and the trailing edge spar 202. According to an embodiment, the intermediate spar 203 may be arranged at the maximum percentage thickness of the wings 10A,10B and the main spar 201 is arranged at a distance from the trailing edge spar 202 equal to about 65%-85% of the distance between the trailing edge spar 202 and the leading edge spar 204. Advantageously, according to an embodiment, all the secondary spars 202-204 are inflatable spars. According to an embodiment, the at least one main spar 201 and the at least one secondary spar 202-204 are in mutual fluid connection and are preferably inflated to the same pressure.

Again with reference to FIG. 2, according to an embodiment, the inflatable body 10 comprises at least one annular chamber 31,31A,31B,32 delimited by the outer skin 11 and extending into the arched wing 10A and the straight wing 10B. According to an embodiment, the inflatable body 10, in particular, comprises a plurality of annular chambers 31,31A,31B,32. According to an embodiment, such a plurality of annular chambers 31,31A,31B,32 comprises chambers in mutual fluid communication. For example, according to an embodiment, the outer skin 11 is fixed, preferably glued, only to the leading edge spar 204 and the trailing edge spar 202, thereby allowing gas to pass between the annular chambers 31,31A,31B,32. According to an alternative embodiment, the outer skin 11 may also be fixed, preferably glued, to the intermediate spar 203, if there is, for example, an aileron provided with a respective chamber. According to an embodiment, in the closed-wing operating configuration the at least one annular chamber 31,31A,31B,32 is inflated to a lower pressure than the pressure at which the at least one main spar 201 and, if provided, the at least one secondary spar 202-204 is inflated. According to a convenient embodiment, the at least one annular chamber 31,31A,31B,32 comprises a pair of annular chambers 31,32. In particular, the pair of chambers 31,32 includes a first annular chamber 31 delimited by the outer shell 11 and defined between the trailing edges 101A,101B of the wings 10A,10B and the main spar 201. Furthermore, the pair of annular chambers 31,32 includes a second annular chamber 32 delimited by the outer shell 11 and defined between the main spar 201 and the leading edge 102A,102B of the wings 10A,10B. According to a further embodiment, two annular chambers 31A,31B may be provided in place of the annular chamber 31. In other words, in such a case, the inflatable body 10 comprises three annular chambers 31A,31B,32, wherein the annular chamber 31A is delimited by the outer shell 11 and defined between the trailing edges 101A,101B of the wings 10A,10B and the intermediate spar 203 while the annular chamber 31B is delimited by the outer shell 11 and defined between the intermediate spar 203 and the main spar 201. According to an embodiment, in the annular chamber 31,31A,31B,32 are each inflated to a lower pressure than the pressure at which the at least one main spar 201 and, if provided, the at least one secondary spar 202-204 is inflated.

Referring to FIG. 2, according to an embodiment, the arched wing 10A and the straight wing 10B each comprise a plurality of planar-shaped ribs 206 made of fabric which are crossed by the at least one main spar 201. In particular, according to an embodiment, the ribs 206 are crossed by both the at least one main spar 201 and the at least one secondary spar 202-204. According to an embodiment, the ribs 206 are configured to allow gas to pass through the at least one annular chamber 31, 31A,31B,32. In particular, if a plurality of annular chambers 31, 31A,31B,32 are provided, e.g. two annular chambers 31,32 or three annular chambers 31A,31B,32, the ribs 206 are configured to allow gas to pass through each of such annular chambers 31,31A, 31B,32.

According to an embodiment, the outer shell 11 comprise a radially outer annular portion 11A and a radially inner annular portion 11B. According to an embodiment, the ribs 206 join the inner and outer annular portions 11A,11B so as to allow making predetermined aerodynamic profiles of the arched wing 10A and the straight wing 10B in the closed-wing operating configuration. According to an embodiment, such aerodynamic profiles of wings 10A,10B have in particular a lenticular shape. According to an embodiment, the annular portions 11A,11B are connected to the at least one main spar 201 and more preferably also to the at least one secondary spar 202-204.

Figure 8:
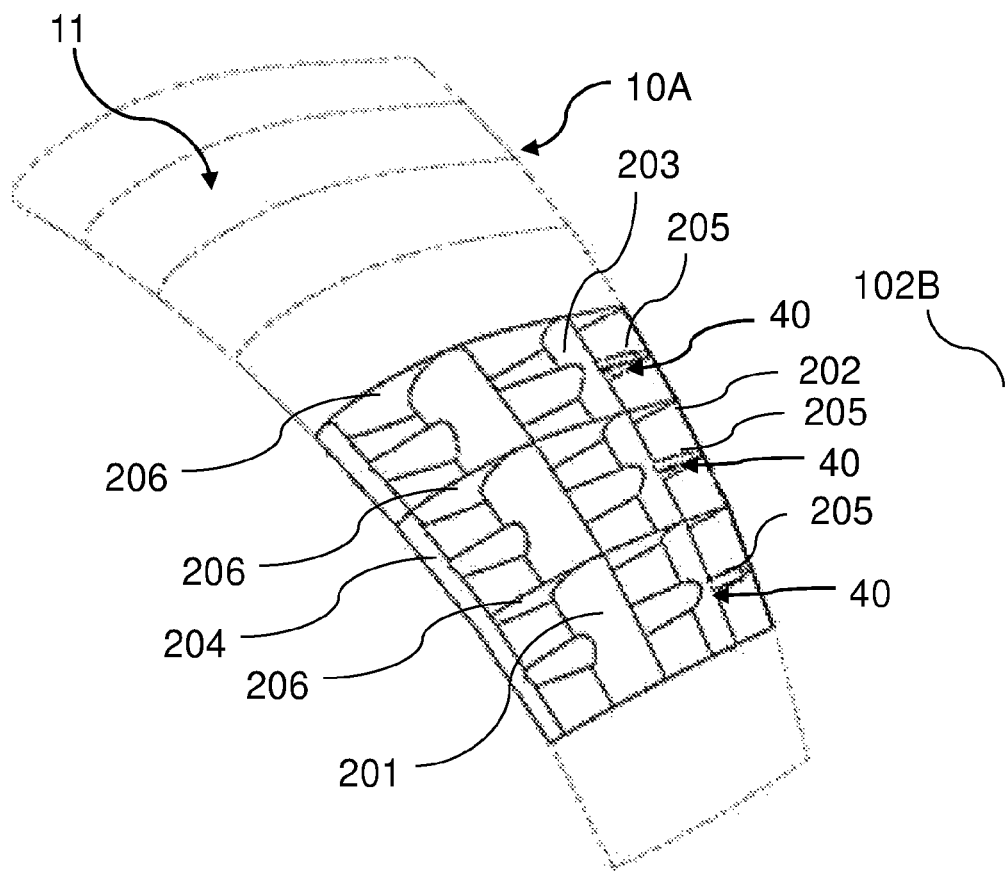
FIG. 8 shows a perspective view of a portion of the aircraft in FIG. 1, from which a portion of the outer shell of the aircraft has been removed.

With reference to FIG. 8, according to an embodiment, the aircraft 1 comprises control elements 40 associated with said at least one annular chamber 31,31A,31B,32 and configured to change the curvature of at least one of the wings 10A,10B. According to an embodiment, the control elements 40 are in particular associated with the chamber 31 or the chamber 31A. Preferably, the control elements 40 are configured to modify the curvature of both wings 10A,10B, preferably by modifying the curvature of the respective control surfaces 80A,80B. According to an embodiment, the control elements 40 comprise soft robotic type actuators 40.

With reference to FIG. 3, according to an embodiment, the inflatable body comprises a plurality of mutually adjacent segments 90, each of which is defined between a pair of consecutive ribs 206 therebetween. More in particular, as can be seen for example in FIG. 3, according to an embodiment, both the arched wing 10A, the straight wing 10B, and the connecting portions 10C,10D comprise a plurality of mutually adjacent segments 90. According to an embodiment, each segment 90 comprises a portion of the outer shell 11, a portion of the at least one main spar 201, a portion of the at least one secondary spar 202-204, and a strut 205 that will be described in greater detail hereafter in this description. In the example of FIG. 3, without thereby introducing any limitation, the inflatable body 10 comprises thirty-six segments 90. In general, during the design phase of the aircraft 1, by varying the distributions of the segments 90 of the arched wing 10A and the straight wing 10B, it is possible to modulate the percentage of how much each wing 10A, 10B contributes to both aerodynamic and aerostatic thrust relative to the total thrust required to balance the weight. Different optimal solutions can be achieved according to the payload 60, flight altitude and assigned cruise speeds.

Referring to FIG. 2, according to an embodiment, the arched wing 10A and the straight wing 10B each comprises a plurality of struts 205 arranged transversely with respect to the trailing edges 101A,101B and the leading edges 102A, 102B of the arched wing 10A and the straight wing 10B. Each strut 205 is connected to the trailing edge 101A,101B and the leading edge 102A,102B of the respective wing 10A,10B. Furthermore, each strut 205 is connected to the at least one main spar 201 and the at least one secondary spar 202-204. Advantageously, the struts 205 space the at least one main spar 201 and the at least one secondary spar 202-204 apart to provide a structure which, by going into compression, reduces the deformation of the outer skin 11 and allows the transfer of loads from the outer skin 11 to the at least one main spar 201 and the at least one secondary spar 202-204. Advantageously, according to an embodiment, the struts 205 of said plurality of struts are inflatable struts 205. According to an embodiment, if the at least one main spar 201, the at least one secondary spar 202-204, and the struts 205 are all inflatable elements, said elements are in mutual fluid communication and in the closed-wing operating configuration are preferably inflated to the same pressure.

According to an embodiment, the aircraft 1 has no ballonet to compensate for gas expansions as altitude changes. This solution advantageously makes it possible to significantly reduce the weight and size of the aircraft 1 relative to the known technique based on an airship-type configuration.

According to an embodiment, the aircraft 1, unlike fixed-wing stratospheric platforms, makes it feasible to embark a payload of 5-100 kg. Indeed, such a payload weight class is not admissible, with current technologies, for fixed wing configurations due to the insurmountable structural and aeroelastic problems associated with the wide wingspans that fixed wing stratospheric platforms necessarily present.

It is worth noting that according to a further embodiment, the aircraft 1 is adapted to be used in the troposphere and connected to the ground by an appropriately sized cable. In other words, according to an embodiment, the aircraft 1 is adapted to be used as a so-called tethered platform.

In this regard, it is worth noting that currently available tethered aerostatic platforms are capable of generating more aerostatic force than is required to balance the overall weight to reduce displacement both vertically and in the plane in the presence of wind. To generate this extra aliquot of aerostatic force, the volume of currently available tethered aerostatic platforms is greater than would be required to balance the overall weight.

The suggested tethered version of the aircraft 1 can counteract the wind by generating aerodynamic force. Since no extra rate of aerostatic force is thus required, the size and therefore the overall weight of aircraft 1 are reduced, given the same payload and wind conditions.

Having described the structure of aircraft 1, an operating mode of such an aircraft is now briefly described by way of non-limiting example, considering the case in which the aircraft 1 is a stratospheric platform.

Figure 9A:
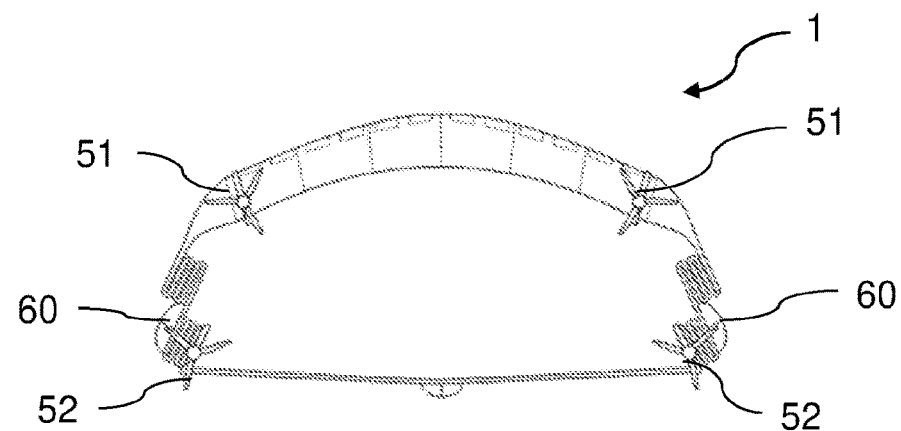
FIGS. 9A-9C are diagrammatic plan views from the front side of the aircraft in FIG. 1 in an initial takeoff configuration, an intermediate configuration, and an operating mission configuration, respectively.
Figure 9B:
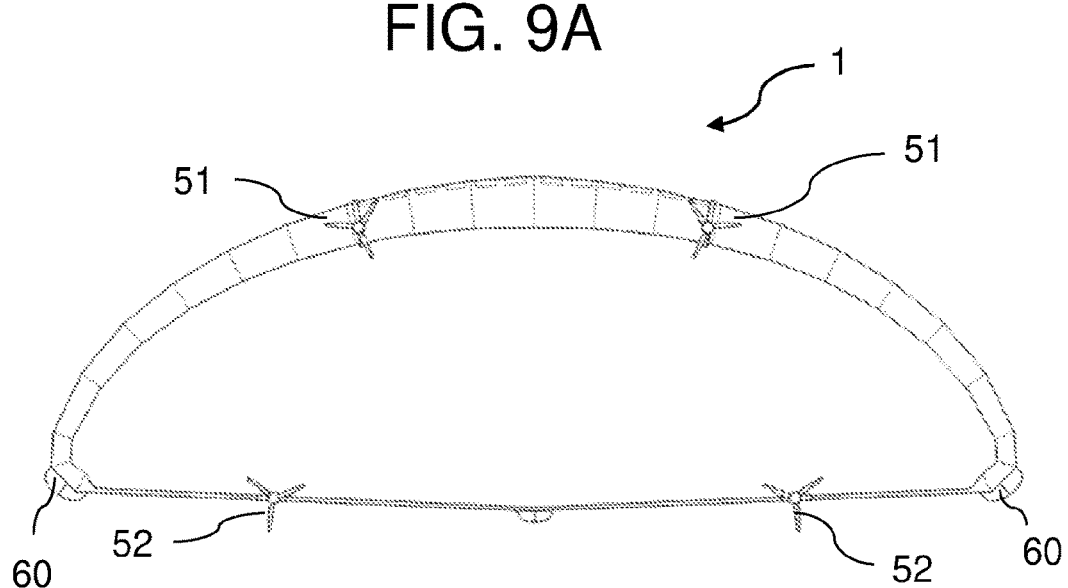
Figure 9C:
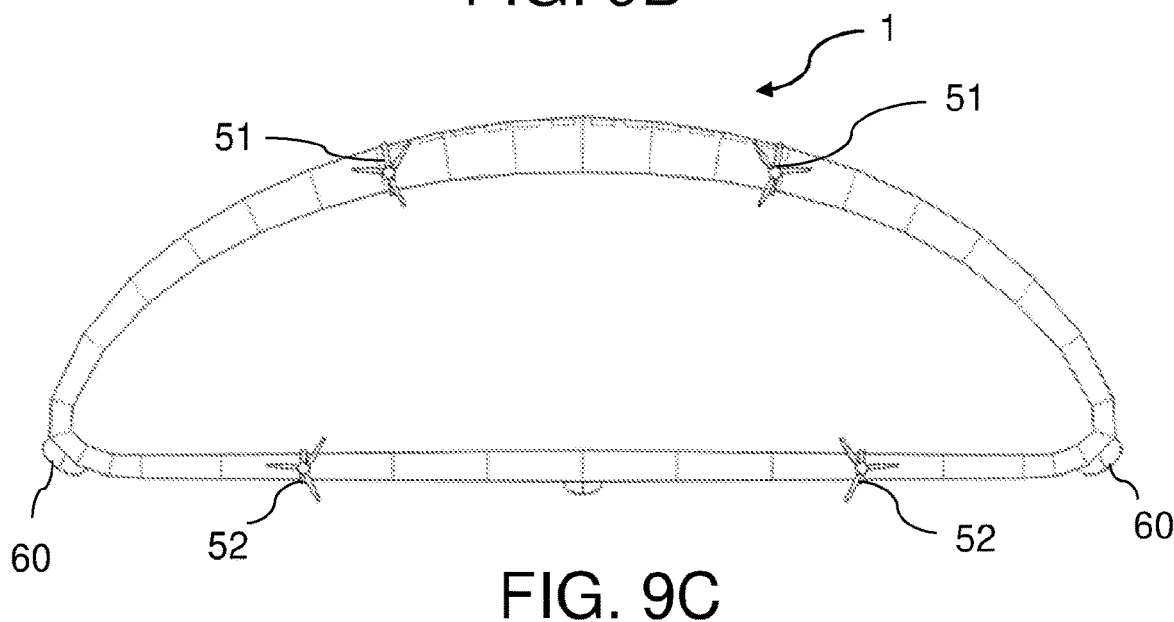

It is worth noting that the geometric shape of aircraft 1 is adapted to change in a predetermined manner from an initial minimum volume ground takeoff shape (FIG. 9A) to a hybrid, aerodynamic shape (e.g., FIG. 9C or FIG. 3). In particular, at takeoff, the aircraft 1 has an ellipsoidal shape (FIG. 9A) and its weight is balanced only by aerostatic thrust. In this manner, takeoff is performed vertically without the need for aerodynamic thrust. It is worth noting that this vertical take-off mode allows a departure from unprepared surfaces; this is a great advantage for tactical applications. The take-off phase, which by choice is thus uncontrolled or at most partially controlled, will see an initial phase in which the gas expands until it completely occupies the available volume in the at least one chamber 31,31A, 31B,32 of the inflatable body 10. The shape of the aircraft 1 transforms continuously as it ascends from the ellipsoid shape to the design shape, i.e. the closed-wing operating configuration (FIG. 9C or FIG. 3). In FIG. 9B a configuration of the aircraft 1 is shown which is intermediate between the takeoff configuration (FIG. 9A) and the design configuration (FIG. 9C). The aircraft 1 assumes the closed-wing operating configuration (FIG. 9C) at a predetermined altitude (5000-10000 m, according to size) where aircraft 1 can generate aerodynamic forces. Once the aerodynamic shape has been acquired, i.e. the closed-wing operating configuration (e.g. FIG. 3 or FIG. 9C), the second part of the ascent phase begins, which, at this point, will make use of both the aerostatic thrust and the aerodynamic thrust generated by the advancement of the aircraft 1 at a predetermined speed. In this phase, the expansion of the gas will not be structurally contained and the excess gas will be released, the lift will balance the part of the weight that will no longer be aerostatically supported.

Upon reaching the required flight altitude (e.g. 16000-21000 meters), the aircraft 1 will begin its mission. Two flight modes are possible according to the wind strength. A first mode is geostationary with respect to a zone of interest and is possible when the wind is in the range of 7-25 m/s. In this mode, the platform uses the relative wind to generate lift. For winds of lower strength, the aircraft 1 has to move on trajectories, which can be circular or rectilinear and will allow developing the necessary lift to complement the aerostatic thrust. Obviously, the aerodynamic thrust will also be able to compensate for aerostatic thrust losses related to gas leakage, which are unavoidable in a helium-filled system, which is intended to remain airborne for a prolonged period of time. In the descent phase, the loss of internal pressure due to altitude will be compensated by introducing, in a controlled and continuous manner, air into the outer shell 11 to maintain the necessary shape useful to support and control the platform in descent to the landing surface. Furthermore, at this phase, the system will be assisted in control by the electric motors 51,52 which draw on the energy reserve stored in the batteries.

The aircraft 1 does not need wide wingspans by virtue of its closed-wing operating configuration. Furthermore, as described above, according to an embodiment the aircraft platform 1 comprises predominantly inflatable elements which are known to be less sensitive to aeroelastic issues, which are related instead to composite structures. Unlike conventional airship-type configurations, the configuration object of this invention has no ballonet, which considerably reduces both the volume and the size of the platform.

Based on the foregoing, it can therefore be understood how an aircraft according to the present description can achieve the above-mentioned purposes.

Without prejudice to the principle of the invention, the embodiments and the manufacturing details may be broadly varied with respect to the above description disclosed by way of a non-limiting example, without departing from the scope of the invention as defined in the appended claims.

What is claimed is:

1. A hybrid aircraft of the unmanned type, configured for joint and optimized use of aerostatic and aerodynamic force, comprising an inflatable body including an outer shell and a load-bearing structure inside said outer shell, said inflatable body being adapted to take a closed wing operating configuration;

wherein in said closed wing operating configuration, said inflatable body comprises a first arched portion adapted to define an arched wing having a leading edge and a trailing edge, a second straight portion adapted to define a straight wing having a leading edge and a trailing edge, a third and a fourth connecting portion arranged at opposite ends of the straight wing, which are adapted to join said arched wing and said straight wing to each other, wherein said load-bearing structure is an annular structure which extends through said arched wing, said straight wing and said third and fourth connecting portions;

wherein said load-bearing structure comprises at least one main annular spar;

wherein said at least one main spar is an inflatable spar.

2. The hybrid aircraft of claim 1, wherein said hybrid aircraft is a stratospheric platform.

3. The hybrid aircraft of claim 1, wherein in said closed wing operating configuration, said at least one main annular spar comprises an arched main spar portion and a straight main spar portion, wherein said arched main spar portion is a tubular portion tapered from a center of the arched main spar portion towards the third and fourth connecting portions, and wherein said straight main spar portion is a tubular portion tapered from a center of the straight main spar portion towards the third and fourth connecting portions.

4. The hybrid aircraft of claim 1, wherein said load-bearing structure further comprises at least one secondary annular spar having a smaller sized cross section than a cross section of said main annular spar.

5. The hybrid aircraft of claim 4, wherein said at least one secondary annular spar is an inflatable spar.

6. The hybrid aircraft of claim 4, wherein said at least one secondary annular spar comprises a leading edge spar arranged at the leading edges of said arched and straight wings, a trailing edge spar arranged at the trailing edges of said arched and straight wings, and an intermediate spar interposed between said main annular spar and said trailing edge spar.

7. The hybrid aircraft of claim 4, wherein said arched wing and said straight wing each comprise a plurality of struts arranged transversely with respect to the leading edges—and to the trailing edges of said arched and straight wings, each of said struts being connected to the leading edge and to the trailing edge of a respective wing, to said at least one main annular spar and to said at least one secondary annular spar.

8. The hybrid aircraft of claim 1, wherein said inflatable body further comprises at least one annular chamber delimited by said outer shell and extending into said arched wing and into said straight wing, said hybrid aircraft further comprising control elements associated with said at least one annular chamber and configured to modify a curvature of at least one of said arched wing and straight wing.

9. The hybrid aircraft of claim 1, wherein the leading edges of said arched and straight wings are mutually offset in a plan bottom view of said hybrid aircraft in said closed wing operating configuration.

10. The hybrid aircraft of claim 1, further comprising a propulsion system including a pair of front propellers mutually spaced apart and associated with said arched wing and a pair of front propellers mutually spaced apart and associated with said straight wing.

11. The hybrid aircraft of claim 1, further comprising a pair of payload bays located at said third and fourth connecting portions.

12. The hybrid aircraft of claim 1, wherein a geometric shape of said hybrid aircraft is adapted to change in a predetermined manner from an initial, minimum-volume ground take-off shape to a hybrid and aerodynamic shape.

* * * * *